(No Model.)
R. T. ONEY.
TROLLEY BICYCLE.
No. 588,465. Patented Aug. 17, 1897.
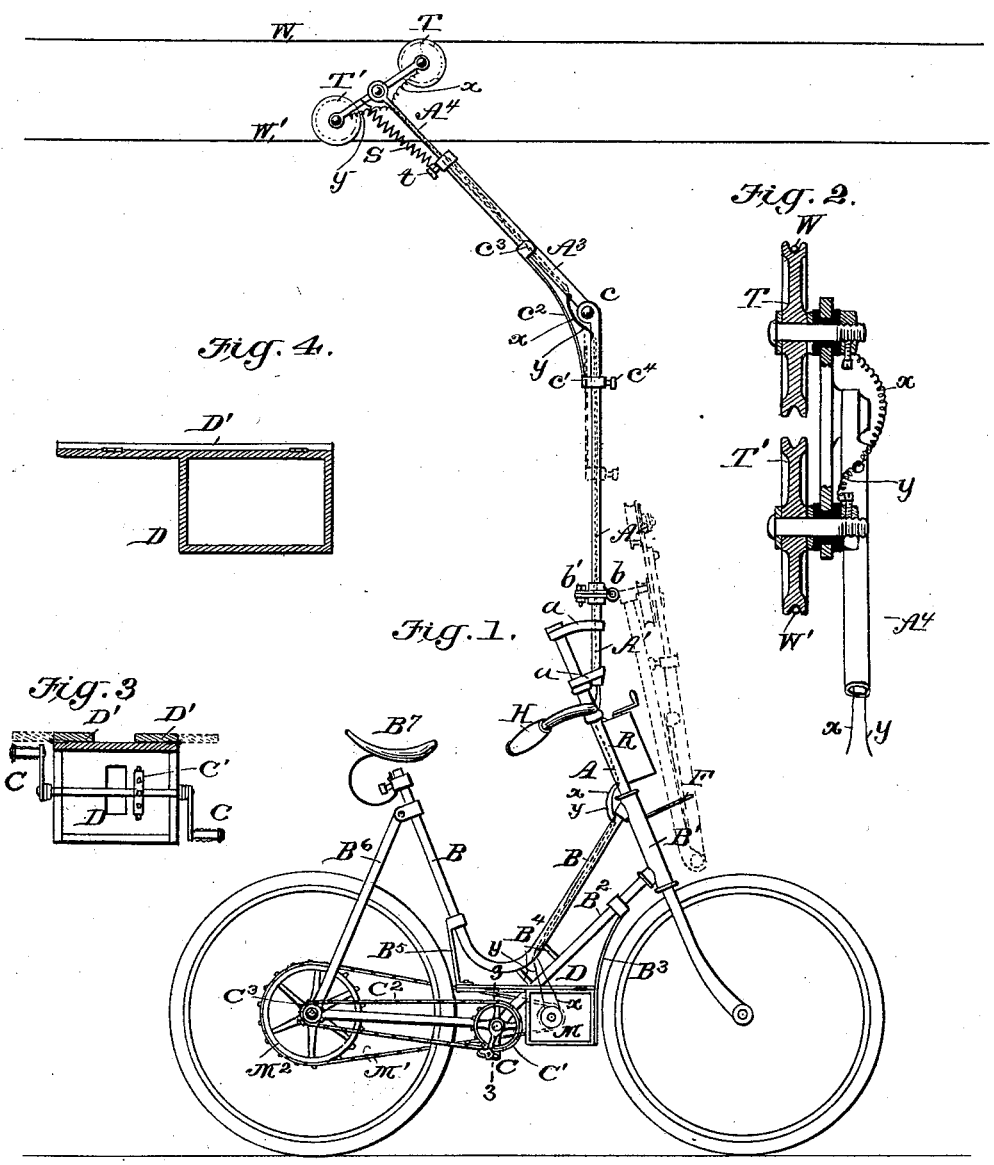
WITNESSES:
Jos. A. Ryan
Edw. W. Byrn
INVENTOR
Robert T. Oney
BY Munn & Co.
ATTORNEYS.

UNITED STATES PATENT OFFICE.

ROBERT T. ONEY, OF CHARLESTON, WEST VIRGINIA.

TROLLEY-BICYCLE.

SPECIFICATION forming part of Letters Patent No. 588,465, dated August 17, 1897.

Application filed September 10, 1895. Serial No. 562,074. (No model.)

*To all whom it may concern:*

Be it known that I, ROBERT T. ONEY, of Charleston, in the county of Kanawha and State of West Virginia, have invented a new and useful Improvement in Trolley-Bicycles, of which the following is a specification.

The object of my invention is to provide a trolley-bicycle adapted to be run upon an ordinary dirt road by an electric motor, but without rails and without being handicapped by the weight of a battery or an individual generator of electricity.

To this end it consists in a specially-organized bicycle carrying an electric motor and having the front portion of its framework extended upwardly in the form of a trolley-pole bearing two trolley-wheels adapted to run against two conducting-wires oppositely charged and having two corresponding wires running from the two trolley-wheels down the trolley-pole to the opposite poles of the motor, the said bicycle being provided with the usual pedals for operation by the feet of the rider, when desired, and the trolley-pole being jointed to fold up, so that the bicycle may be operated in the usual way over any road and independently of the electric conduction-wires, when desired, or be geared to the conducting-wires to run the bicycle by electric power, or the power and pedal mechanism may both be made available at the same time, as might in some cases be desirable, as in climbing hills or in emergencies where the power of the electric current or the effectiveness of the motor might be accidentally diminished.

Figure 1 is a side elevation of my invention. Fig. 2 is an enlarged sectional detail of the trolley. Fig. 3 is a vertical transverse section of the motor-box, taken on line 3 3 of Fig. 1; and Fig. 4 is a vertical longitudinal section of the motor-box.

In the drawings, A is what is known as the "vertical" fork of the machine. This carries the front bicycle-wheel, swivels in the sleeve B', and has rigidly-attached handle-bars H, by which the front wheel is turned and the machine guided.

The main frame of the bicycle is composed of the V-shaped bar B, sleeve B', and bars $B^2$ and $B^6$. The V-shaped bar is connected at its forward end to the top of the sleeve B', and at its rear end bears the saddle $B^7$. The bar $B^2$ at its forward end is connected to the lower end of sleeve B', and at its rear end extends to and carries the bearing for the crank-axle of pedal-cranks C, being connected at $B^4$ by short braces to the V-shaped bar B. The rear bar $B^6$ extends from a point near the saddle on bar B down to and carries the bearing for the axle of the rear wheel.

Between the two wheels of the bicycle and hung from the main frame by braced supports $B^3$ and $B^5$ is the motor-box D, carrying within it an electric motor M, whose armature-shaft is provided with a sprocket-wheel that transmits its power through a chain belt M' to the large sprocket-wheel $M^2$, rigid on the rear wheel. The top of the motor-box (see Fig. 4) is extended rearwardly, so as to cover the sprocket-wheel C', rigid on the axle of pedal-cranks C. This sprocket-wheel transmits its power through a chain belt $C^2$ to a small sprocket-wheel $C^3$, rigid on the axle of the rear wheel. On the sides of the motor-box are hinged two overhanging wings or guards D' D', which may be folded over to expose the pedal-cranks, as in Fig. 3, when the feet are to be used on the same, and at other times are turned over, as indicated in dotted lines in Fig. 3, to act as guards or protecting-covers for said cranks.

From the shaft A of the front wheel there extends a sectional trolley-pole A' $A^2$ $A^3$ $A^4$, bearing at its upper end a trolley carrying two wheels T T', adapted to bear against two separated conducting-wires W W', oppositely charged with an electric current from the two poles of any suitable generator. These two trolley-wheels and their shafts are insulated from each other, but are connected to insulated wires $x$ and $y$, that run down centrally through the tubular trolley-pole and connect with a rheostat or regulator R on the front shaft A and thence extend to the opposite poles of the motor, so that a current of electricity may be taken from one conducting-wire W through one trolley-wheel T and wire $x$ and be directed down to and through the motor to actuate it and thence be returned by the other wire $y$ and trolley-wheel T' to the other conducting-wire W', the power of the current thus transmitted being regulated by the rheostat R in the well-known way.

The first section A' of the trolley-pole is connected to the front shaft A of the bicycle by two metal straps $a$ $a$ and is jointed to the second section at $b$, being fastened in alinement therewith by a clamp-screw $b'$. The upper end of the section $A^2$ is also jointed to the section $A^3$ at $c$, and to make this a flexible or springing joint I employ a flat spring $c^2$, which laps across this joint. This spring is attached to a sliding collar $c'$, which is rendered adjustable and is secured in place on section $A^2$ by a set-screw, while the upper end of the spring carries a forked clamp $c^3$, that embraces the next upper section $A^3$. Within the section $A^3$ there slides telescopically the top section $A^4$, which is pivotally connected with the trolley-frame and is adjustable in section $A^3$ by means of the set-screw $t$, so that it may be extended or drawn in longitudinally or be rotated axially. A spring S connects the trolley-frame on one side of the tube $A^4$ to the set-screw $t$ and causes the two trolley-wheels to bear with an elastic pressure in opposite directions against the metal conducting-wires W W' to insure a continuous and even contact therewith.

From the above description it will be seen that the front shaft A of the bicycle forms a part of the trolley-pole, and the trolley-pole connection, although made with the front part of the bicycle, where trolley-pole, handle-bar, and regulator are in front of the rider and under his constant inspection and easy manipulation, yet the trolley itself trails or drags in the rear under the most favorable conditions for maintaining contact with the conductor-wires without cramping or binding therewith.

When the bicycle is to be detached from the conductor-wires, the telescopic section $A^4$ is drawn into the next tubular section $A^3$, the set-screw $c^4$ is lowered, and the collar $c'$, with spring $c^2$, is adjusted downwardly, as shown in dotted lines, and the three trolley-pole sections are folded about the joints $b$ and $c$, the section $A^2$ downwardly and forwardly and the section $A^3$ backwardly, and these folded sections are then secured upon the forked support F on the tube B' of the main frame, as indicated in dotted lines, where they can be conveniently carried by the rider in transporting the bicycle by the aid of the pedals to its storage-place or in traveling over the road to another trolley-line, it being the intention to have such paired trolley-lines W W' running between towns and cities, so as to permit long-distance trips on the bicycle to be easily and quickly made without tiresome and exhausting exercise.

I do not confine my invention to its use with the bicycle alone, as it is obvious that tricycles or other form of carriage might be used in connection with my invention.

I am aware that it is not new to provide an electrically-propelled carriage in which a conducting-floor and a conducting-ceiling are oppositely charged from a generator of electricity and the motor of the carriage has its terminals extended and connected to the floor and the ceiling by conducting contact-points.

I am also aware that a trolley-arm has been provided with two wheels bearing against the same side of two different conducting-wires and adapted to take the current from one wire and return it to the other.

My invention is distinctive in the fact that the bicycle runs upon no track or conducting-floor, but upon any road-bed, and its two-wheeled trolley is held between two conducting-wires overhead and bear in opposite directions against the same, so that the bicycle is relieved of the weight and strain of the trolley, which would have a tendency to interfere with the proper guiding of the bicycle. This interposition of the double-wheeled trolley between the two conductors also prevents any jolting or variation in the travel of the bicycle over rough roads from disconnecting the trolley from the conducting-wires.

Having thus described my invention, what I claim as new, and desire to secure by Letters Patent, is—

1. A trolley-driven carriage arranged to run upon ordinary roads and having an electric motor geared to one of its wheels, in combination with a trolley-pole connected to its main frame and carrying a double-wheeled trolley, two conductor-wires arranged on opposite sides of the trolley and holding it between them, and branch wires leading from the two trolley-wheels to the two poles of the motor substantially as and for the purpose described.

2. A trolley-driven carriage having a trolley-pole made in jointed sections bearing a trolley at its upper end, and a support upon said carriage adapted to receive and carry said trolley-pole when folded down about its joints substantially as and for the purpose described.

3. A trolley-driven carriage having an electric motor geared to one of its wheels, a trolley-pole having two wires leading from the opposite poles of said motor, a two-wheeled trolley arranged upon the end of said pole and connected respectively to the two wires, two conducting-wires both arranged overhead and connecting respectively with the trolley-wheels on opposite sides thereof and retaining the trolley between them, and a pair of pedals and operating-gear connecting with one of the wheels of the carriage substantially as shown and described.

4. The combination with a trolley-driven carriage and its motor; of a pedal driving-gear, and movable wings or guards for cutting off or permitting access to the pedals substantially as shown and described.

5. The combination with the trolley-driven carriage containing a motor; of a motor-case inclosing the motor, hinged leaves or wings attached to the same, and a pedal-gear arranged beneath such hinged leaves or wings substantially as and for the purpose described.

6. The combination with a trolley-driven carriage having swiveling vertical guide-shaft A; of the trolley-pole attached thereto and made in hinged sections $A'$ $A^2$ $A^3$ with joints at $b$ and $c$, a locking device for the joint $b$, and an adjustable spring overlapping the joint $c$ substantially as and for the purpose described.

7. A trolley consisting of a lever, two insulating conducting-wheels located upon opposite sides of the fulcrum, a supporting stem or pole connected to said fulcrum, and a spring connected to the lever-frame and arranged to pull upon one side of the fulcrum of the said lever-frame substantially as shown and described.

8. A trolley consisting of a lever, two insulated conducting-wheels located upon opposite sides of the fulcrum, a supporting stem or pole connected to said fulcrum, a telescopic tube receiving the said stem, and a spring connected to the lever-frame at one side of its fulcrum substantially as and for the purpose described.

ROBERT T. ONEY.

Witnesses:
JOHN C. MALONE,
C. G. PEYTON.